D. G. BOARDMAN.
Corn-Planters.
No. 136,961. Patented March 18, 1873.
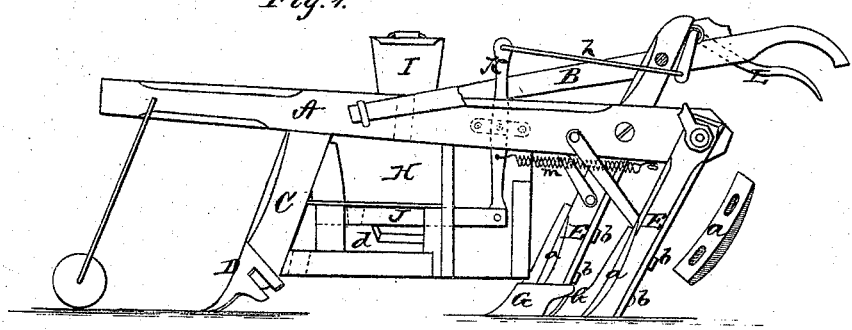
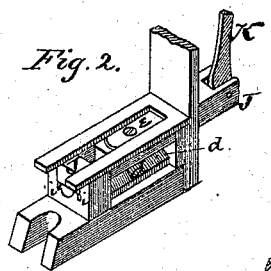
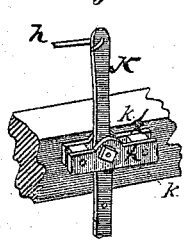
Witnesses:
Henry N. Miller
C. L. Evert
Inventor.
D. G. Boardman,
per
Alexander & Mason
Attorneys.

UNITED STATES PATENT OFFICE.

DAVID G. BOARDMAN, OF ALBIA, IOWA.

IMPROVEMENT IN CORN-PLANTERS.

Specification forming part of Letters Patent No. 136,961, dated March 18, 1873.

*To all whom it may concern:*

Be it known that I, D. G. BOARDMAN, of Albia, in the county of Monroe and in the State of Iowa, have invented certain new and useful Improvements in Corn-Planter; and do hereby declare that the following is a full, clear, and exact description thereof, reference being had to the accompanying drawing and to the letters of reference marked thereon making a part of this specification.

The nature of my invention consists in the construction and arrangement of a corn-planter, as will be hereinafter more fully set forth.

In order to enable others skilled in the art to which my invention appertains to make and use the same, I will now proceed to describe its construction and operation, referring to the annexed drawing, in which—

Figure 1 is a side elevation of my entire corn-planter with the side of the corn-box removed to show the interior of the same. Figs. 2, 3, and 4 are detached views of certain parts of the same.

A represents an ordinary plow-beam with handles B B. At a suitable distance from the front end of the beam A is a foot or standard, C, to which the furrow-plow D is secured. At the rear end of the beam are two other feet or standards, E E, one on each side and one a little in advance of the other, to the lower ends of which the covering-plows G G are attached. The front side of each of the standards E, at the lower end, is made concave, and between the plow G and said concave portion is interposed a bar, $a$, which is convex on its rear side. The bolts $b\ b$, which fasten the plow to the standard pass through longitudinal slots in said bar, so that by loosening the nuts on the bolts the said bar may be moved up or down at will, thereby throwing the point of the plow further down or up, as may be desired, thus readily regulating the depth of the plowing. The plows G G may be removed and shovels for cultivating substituted. The front plow D is regulated by the clevis at the front end of the beam. H is the corn-box, located under the beam A, in rear of the foot or standard C, and is filled through the hopper I on top of the beam, as shown in Fig. 1. On the bottom of the corn-box H is a bar, $d$, upon which the slide J rests and moves back and forth. This bar $d$ is cut out in the middle, with slanting sides forming supports only at each end for the slide J, and has grooves $i$, as shown in Fig. 2, one on each side through the front end. When the slide moves back and forth it clears itself of all dirt and dust, and the dirt can also work off sidewise. In the slide J is a plate, $f$, the outer end of which projects down in the opening of the slide. This plate is to regulate or gage the amount of corn to be planted at each movement of the slide. The plate $f$ is slotted longitudinally, and a screw passed through the same to hold it in any desired position. A collar, $e$, is put on said screw to hide the slot in the plate and prevent corn from catching and clogging in the same.

The corn, moved forward by the slide J, drops down through a passage in the bottom of the corn-box immediately in rear of the plow D.

To the rear end of the slide J is attached a lever, K, pivoted between two plates, $k\ k$, on the side of the beam A, and the upper end of this lever is, by a rod, $h$, connected with a crank-lever, L, on one of the handles B, by which means the dropping mechanism is readily operated. A spiral spring, $m$, attached to the lever K, throws the slide V back in position.

Having thus fully described my invention, what I claim as new, and desire to secure by Letters Patent, is—

1. The combination of the corn-box H, bar $d$ with inclined sides and grooves $i$, and the slide J with adjustable plate $f$ and collar $e$, said slide being operated by the lever K, rod $h$, spring $m$, and crank-lever L, substantially as and for the purposes herein set forth.

2. The combination of the plow G, concave standard E, and convex bar $a$ with longitudinal slots, substantially as and for the purposes herein set forth.

In testimony that I claim the foregoing I have hereunto set my hand this 2d day of August, 1872.

DAVID G. BOARDMAN.

Witnesses:
WM. R. KELSEY,
ROBERT B. RAMSAY.